(12) United States Patent
Nagashima

(10) Patent No.: US 8,230,049 B2
(45) Date of Patent: Jul. 24, 2012

(54) INFORMATION PROCESSING APPARATUS, INFORMATION PROCESSING APPARATUS CONTROL METHOD, AND STORAGE MEDIUM STORING COMPUTER PROGRAM

(75) Inventor: Takeyuki Nagashima, Tokyo (JP)

(73) Assignee: Canon Kabushiki Kaisha (JP)

( * ) Notice: Subject to any disclaimer, the term of this patent is extended or adjusted under 35 U.S.C. 154(b) by 262 days.

(21) Appl. No.: 12/167,378

(22) Filed: Jul. 3, 2008

(65) Prior Publication Data
US 2009/0013065 A1    Jan. 8, 2009

(30) Foreign Application Priority Data
Jul. 3, 2007    (JP) .................................. 2007-175462

(51) Int. Cl.
*G06F 15/177* (2006.01)
(52) U.S. Cl. ...................................................... 709/220
(58) Field of Classification Search .................... 709/220
See application file for complete search history.

(56) References Cited

U.S. PATENT DOCUMENTS

| | | | | |
|---|---|---|---|---|
| 6,970,941 | B1 * | 11/2005 | Caronni et al. .............. | 709/238 |
| 7,253,915 | B2 * | 8/2007 | Kemp et al. .................. | 358/1.15 |
| 7,312,887 | B2 * | 12/2007 | Wu .............................. | 358/1.15 |
| 7,353,304 | B2 * | 4/2008 | Abe ............................... | 710/72 |
| 7,545,525 | B2 * | 6/2009 | Idehara ........................ | 358/1.15 |
| 7,730,224 | B2 * | 6/2010 | Kikuchi ........................... | 710/8 |
| 2002/0112076 | A1 * | 8/2002 | Rueda et al. ................... | 709/245 |
| 2005/0128968 | A1 * | 6/2005 | Yang ............................ | 370/312 |
| 2005/0210463 | A1 * | 9/2005 | Abe .............................. | 717/174 |
| 2006/0077977 | A1 * | 4/2006 | Caronni et al. ............... | 370/392 |
| 2006/0119889 | A1 * | 6/2006 | Kim .............................. | 358/1.15 |
| 2007/0083679 | A1 * | 4/2007 | Kikuchi ........................... | 710/8 |
| 2007/0086052 | A1 * | 4/2007 | Furuya ......................... | 358/1.15 |
| 2008/0151283 | A1 * | 6/2008 | Wang et al. .................. | 358/1.13 |
| 2008/0180726 | A1 * | 7/2008 | Selvaraj ....................... | 358/1.15 |
| 2009/0011708 | A1 * | 1/2009 | Kim et al. .................... | 455/41.3 |
| 2009/0013065 | A1 * | 1/2009 | Nagashima .................. | 709/223 |
| 2010/0257258 | A1 * | 10/2010 | Liu et al. ...................... | 709/220 |

FOREIGN PATENT DOCUMENTS

JP    2004-287764 A    10/2004

* cited by examiner

*Primary Examiner* — Jerry Dennison
(74) *Attorney, Agent, or Firm* — Rossi, Kimms & McDowell LLP

(57) ABSTRACT

When an information processing apparatus has moved from one sub-area to another sub-area, anycast is performed to a plurality of management servers using an IP address for anycast in accordance with network management information. Network management information is acquired from a management server which has responded to the anycast. The acquired network management information and installed device driver information are analyzed. If there is a device driver for a device belonging to the sub-area managed by the management server which has responded, one of the devices belonging to the other sub-area is selected as a default device. This arrangement enables the selection of an appropriate default printer when a client has moved from a network environment managed by one management server to another network environment managed by another management server.

6 Claims, 13 Drawing Sheets

FIG. 3A

301 MANAGED DEVICES INFORMATION TABLE

MANAGEMENT SERVER_A

301a | 301b
---|---
PRINTING DEVICE NAME | IP ADDRESS
MFP-1A | 100.10.0.1
MFP-2A | 100.10.0.2

MANAGEMENT SERVER_B

| PRINTING DEVICE NAME | IP ADDRESS |
|---|---|
| MFP-1B | 100.10.1.1 |
| MFP-2B | 100.10.1.2 |

MANAGEMENT SERVER_C

| PRINTING DEVICE NAME | IP ADDRESS |
|---|---|
| MFP-1C | 100.10.2.1 |
| MFP-2C | 100.10.2.2 |

302 NETWORK MANAGEMENT INFORMATION TABLE

MANAGEMENT SERVER_A

| | |
|---|---|
| SERVER NAME | MANAGEMENT SERVER |
| IP ADDRESS FOR UNICAST | 100.10.0.0 |
| IP ADDRESS FOR ANYCAST | 150.10.0.0 |
| MANAGEMENT NETWORK ID | 100.10.0.xxx |

302a, 302b, 302c, 302d

MANAGEMENT SERVER_B

| | |
|---|---|
| SERVER NAME | MANAGEMENT SERVER_B |
| IP ADDRESS FOR UNICAST | 100.10.1.0 |
| IP ADDRESS FOR ANYCAST | 150.10.0.0 |
| MANAGEMENT NETWORK ID | 100.10.1.xxx |

MANAGEMENT SERVER_C

| | |
|---|---|
| SERVER NAME | MANAGEMENT SERVER_C |
| IP ADDRESS FOR UNICAST | 100.10.2.0 |
| IP ADDRESS FOR ANYCAST | 150.10.0.0 |
| MANAGEMENT NETWORK ID | 100.10.2.xxx |

FIG. 3B

303 ASSOCIATING INFORMATION TABLE

MANAGEMENT SERVER_A

| ASSOCIATION NAME | PRINTING DEVICE NAME | DRIVER NAME |
|---|---|---|
| AREA-A_2F | MFP-2A | Driver_A_v100 |
| AREA-A_1F | MFP-1A | Driver_A_v100 |

(303a, 303b, 303c)

MANAGEMENT SERVER_B

| ASSOCIATION NAME | PRINTING DEVICE NAME | DRIVER NAME |
|---|---|---|
| AREA-B_2F | MFP-2B | Driver_A_v100 |
| AREA-B_1F | MFP-1B | Driver_A_v100 |

MANAGEMENT SERVER_C

| ASSOCIATION NAME | PRINTING DEVICE NAME | DRIVER NAME |
|---|---|---|
| AREA-C_2F | MFP-2C | Driver_A_v100 |
| AREA-C_1F | MFP-1C | Driver_A_v100 |

304 DEFAULT PRINTER INFORMATION TABLE

| CLIENT NAME | PRINTER NAME |
|---|---|
| CLIENT_A | AREA-A_2F |

(304a, 304b)

| CLIENT NAME | PRINTER NAME |
|---|---|
| CLIENT_A | AREA-B_2F |

| CLIENT NAME | PRINTER NAME |
|---|---|
|  |  |

F I G. 4
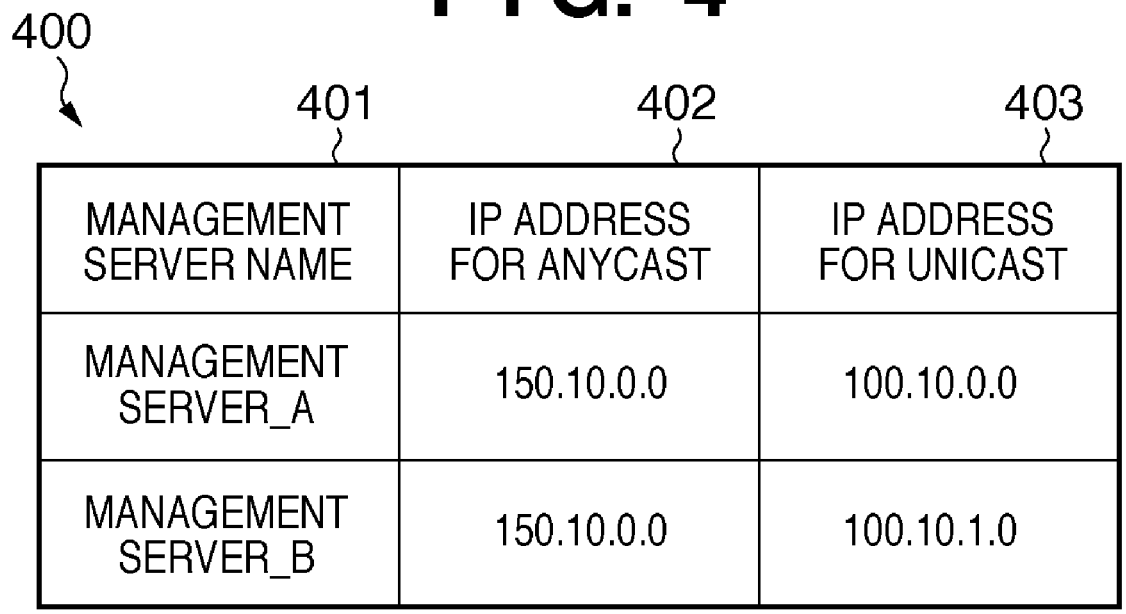

FIG. 5

CLIENT_A

[PRINTER FOLDER]

| PRINTER NAME | PRINTING DEVICE NAME | IP ADDRESS |
|---|---|---|
| AREA-A_1F | MFP-1A | 100.10.0.1 |
| * AREA-A_2F | MFP-2A | 100.10.0.2 |
| AREA-B_1F | MFP-1B | 100.10.1.1 |
| AREA-B_2F | MFP-2B | 100.10.1.2 |

* PRINTER TO BE USED NORMALLY (DEFAULT PRINTER)

⬆

CLIENT_A

[PRINTER FOLDER]

| PRINTER NAME | PRINTING DEVICE NAME | IP ADDRESS |
|---|---|---|
| AREA-A_1F | MFP-1A | 100.10.0.1 |
| AREA-A_2F | MFP-2A | 100.10.0.2 |
| AREA-B_1F | MFP-1B | 100.10.1.1 |
| * AREA-B_2F | MFP-2B | 100.10.1.2 |

* PRINTER TO BE USED NORMALLY (DEFAULT PRINTER)

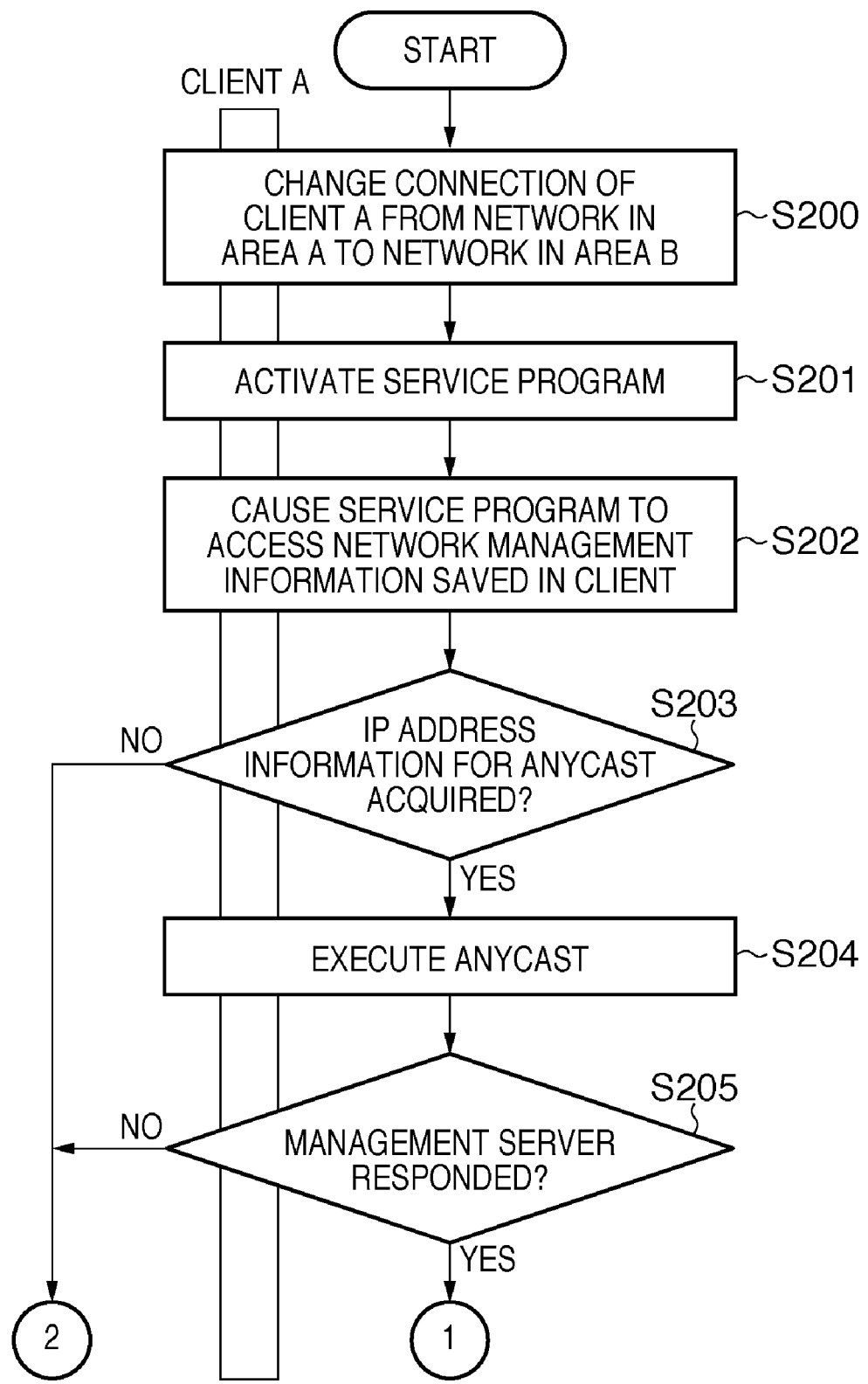

INFORMATION PROCESSING APPARATUS, INFORMATION PROCESSING APPARATUS CONTROL METHOD, AND STORAGE MEDIUM STORING COMPUTER PROGRAM

BACKGROUND OF THE INVENTION

1. Field of the Invention

The present invention relates to a process when an arbitrary client having a driver corresponding to a device connected to a network environment has moved from a network environment managed by one management server to another network environment managed by another management server and, more particularly, to a process of causing the client to select an appropriate default printer in the connected network environment by performing anycast or unicast to a management server.

2. Description of the Related Art

Conventionally, a print system in an environment where, for example, mobile computing is performed while changing the place of task as needed installs a plurality of drivers in each client and implements printing using a printing device installed in a current position. It is also necessary to change the default printer of the plurality of printer drivers in correspondence with the place of use.

The following methods of changing the default printer have been proposed so far.

(1) A user consciously changes the default printer.

(2) Some notebook PCs save the settings themselves of a network environment and, when connected to a network, implement network settings suitable for the environment.

(3) During printer setup, the network ID of a work area connected to a PC is stored. At the time of a print request, the network ID of a work area connected to the PC is detected. The network ID of the work area connected to the PC, which is saved during setup of a printer selected as an output destination, is compared with the network ID of the work area currently connected to the PC. If the network IDs are different, a warning message is displayed and a list of printers set up using the network ID that matches the current network ID is displayed. A print process is implemented by selecting an arbitrary printer.

(4) A client detects a deletion request that requests deletion of a printer driver. If the printer driver to be deleted is set as a printer driver to be used normally, the user is prompted to set another printer driver different from the deletion request target as the printer driver to be used normally (Japanese Patent Laid-Open No. 2004-287764).

In the above-described prior art (1), the user manually changes the default printer. If he/she forgets to make the change, a printing device installed in an inappropriate place may execute printing.

In prior art (2), the network settings are changed, although the default settings of the printer driver cannot be changed. Alternatively, since only a printer driver suitable for a certain environment exists, a new printer driver must be installed to execute printing upon moving from an area A to an area B.

In prior art (3), the PC complies with only the network environment corresponding to the network ID stored in advance. Assume that network IDs A and B are saved. If the PC is connected to a network whose network ID is C, it has no corresponding printer driver. It is therefore necessary to separately install the printer driver. In this case, the user must manually install the printer driver.

As described above, the prior art especially has the problems of usability, an increase of management cost, and an increase of TCO caused by low task efficiency.

SUMMARY OF THE INVENTION

The present invention has been made in consideration of the problems of the above-described prior art, and has as its object to enable to select an appropriate default printer when a client has moved from a network environment managed by one management server to another network environment managed by another management server and is connected to the network.

This improves the usability and management cost and reduces TCO by raising the efficiency of task.

In order to solve the above-described problems, there is provided an information processing apparatus which is a client in a network environment including a plurality of management servers each having an IP address for anycast and an IP address for unicast, a plurality of devices, and the client, each of the management servers managing the plurality of devices in a sub-area in the network environment, and the client having device drivers installed in correspondence with the devices connected to the network environment, and when moving from one sub-area managed by one management server to another sub-area managed by another management server, selecting one device from the other sub-area, the information processing apparatus comprising: an anycast unit adapted to, when the information processing apparatus has moved from the one sub-area to the another sub-area, perform anycast to the plurality of management servers using the IP address for anycast in accordance with network management information managed by the information processing apparatus; a first acquirement unit adapted to acquire network management information managed by a management server which has responded to the anycast; a second acquirement unit adapted to acquire device driver information installed in the information processing apparatus; a first judgment unit adapted to judge, by analyzing the acquired network management information and the device driver information, whether or not there is a device driver for a device belonging to the sub-area managed by the management server which has responded to the anycast; and a selection unit adapted to select, as a default device, one of the devices belonging to the another sub-area if there is a device driver for the device belonging to the sub-area managed by the management server which has responded to the anycast.

There is also provided a method of controlling an information processing apparatus which is a client in a network environment including a plurality of management servers each having an IP address for anycast and an IP address for unicast, a plurality of devices, and the client, each of the management servers managing the plurality of devices in a sub-area in the network environment, and the client having device drivers installed in correspondence with the devices connected to the network environment, and when moving from one sub-area managed by one management server to another sub-area managed by another management server, selecting one device from the another sub-area, the method comprising the steps of: performing anycast to the plurality of management servers using the IP address for anycast in accordance with network management information managed by the information processing apparatus, when the information processing apparatus has moved from the one sub-area to the another sub-area; acquiring network management information managed by a management server which has responded to the anycast; acquiring device driver information installed in the information processing apparatus; judging, by analyzing the acquired network management information and the device driver information, whether or not there is a device driver for a device belonging to the sub-area managed by the management server which has responded to the anycast; and selecting, as a default device, one of the devices belonging to the another sub-area if there is a device driver for the device belonging to the sub-area managed by the management server which has responded to the anycast.

There is further provided an information processing apparatus comprising: an anycast unit adapted to perform anycast using an address for anycast to a plurality of management servers each having an address for anycast; an acquirement unit adapted to acquire network management information from a management server which has responded to the anycast; and a selection unit adapted to select, using the network management information acquired by the acquirement unit, a device driver to be used.

There is still further provided a method of controlling an information processing apparatus, comprising the steps of: performing anycast using an address for anycast to a plurality of management servers each having an address for anycast; acquiring network management information from a management server which has responded to the anycast; and selecting, using the network management information acquired in the acquiring step, a device driver to be used.

According to the present invention, it is possible to select an appropriate default printer when a client has moved from a network environment managed by one management server to another network environment managed by another management server and is connected to the network.

This improves the usability and management cost and reduces TCO by raising the efficiency of task.

Further features of the present invention will become apparent from the following description of exemplary embodiments (with reference to the attached drawings).

BRIEF DESCRIPTION OF THE DRAWINGS

FIGS. 3A and 3B are a view showing examples of information tables managed by management servers according to the embodiment;

FIG. 4 is a view showing an example of an information table managed by a client according to the embodiment;

FIG. 5 is a view showing printer information installed in the client of the embodiment and an example of transition of a default printer;

FIG. 7 is a flowchart illustrating a preceding-stage process when the client A of the embodiment has moved from an area A to an area B;

DESCRIPTION OF THE EMBODIMENTS

The embodiment of the present invention will now be described in detail with reference to the accompanying drawings. In this embodiment, a printer driver will be explained as a device driver. However, the present invention is also applicable to any other device drivers such as a scanner driver and incorporates them. More specifically, a device driver of the present invention includes a printer driver or a scanner driver. A default device includes a default printer or a default scanner.

<Example of System Arrangement of Embodiment>

Figure 1:
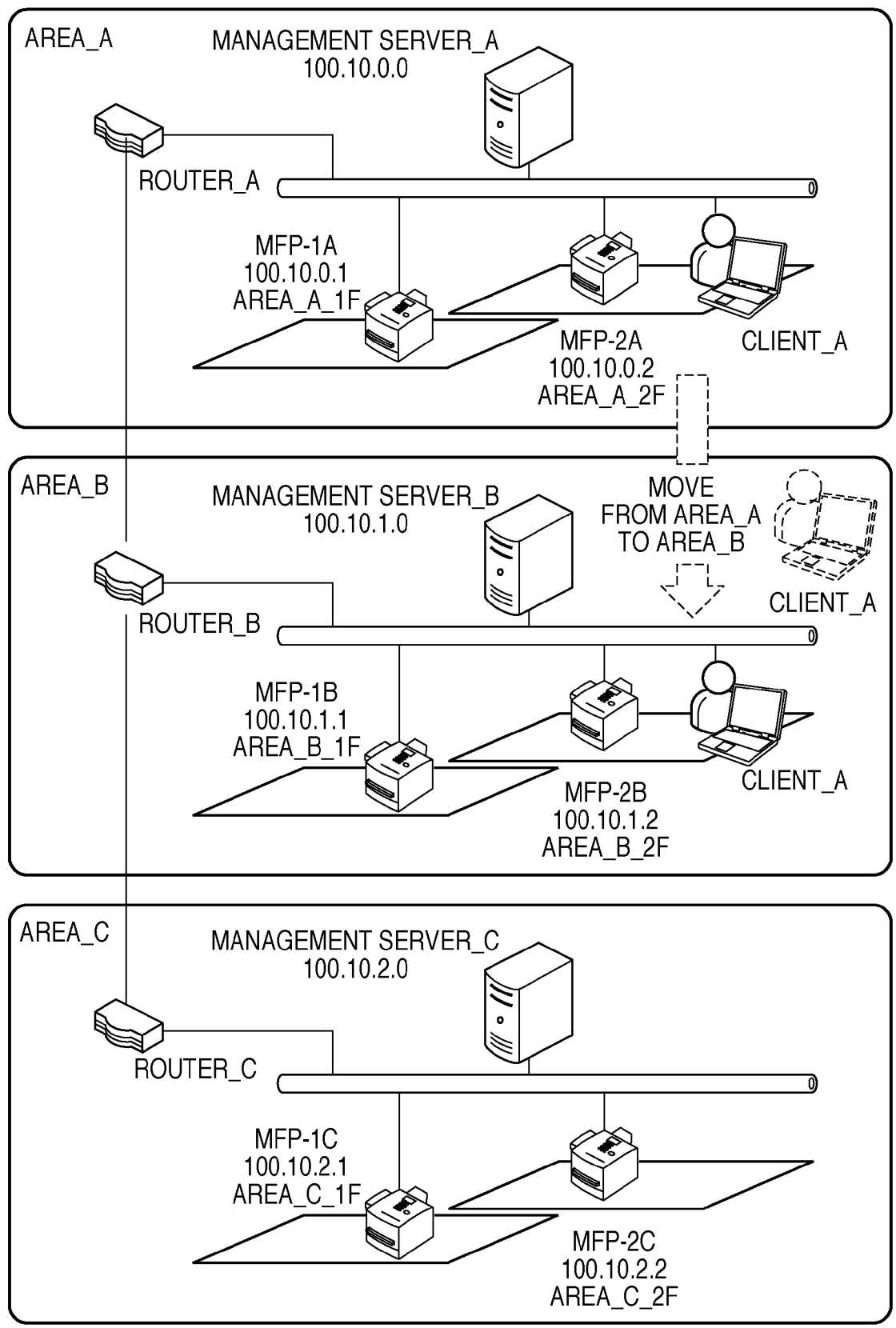
FIG. 1 is a view showing an example of a system arrangement to which an information processing apparatus according to the embodiment is applied.

FIG. 1 is a view showing an example of a system arrangement according to the embodiment of the present invention.

FIG. 1 shows a case in which a client A has moved from connection in an area A to connection in an area B in a network environment. The areas A to C in the network environment will also be referred to as sub-areas hereinafter.

In this example, the default printer of printer drivers installed in the client A automatically changes from MFP-2A in an area A-2F to MFP-2B in an area B-2F, as shown in FIG. 5.

If the client A has no printer drivers corresponding to printing devices in the connected network environment, it judges whether or not to install the printer drivers corresponding to the printing devices in the network environment.

Assume that the client A is connected to the area C in the network environment in FIG. 1.

(Detailed Example of System Arrangement)

In FIG. 1, the network environment formed from routers A, B, and C includes the areas A, B, and C.

The area A has an environment to which a management server A, printing devices MFP-1A and MFP-2A, and the client A are connectable as needed. The management server A manages the printing devices MFP-1A and MFP-2A arranged in the area A of the network environment.

Similarly, the area B has an environment to which a management server B, printing devices MFP-1B and MFP-2B, and the client A are connectable as needed. The management server B manages the printing devices MFP-1B and MFP-2B arranged in the area B of the network environment.

Similarly, the area C has an environment to which a management server C, printing devices MFP-1C and MFP-2C, and the client A are connectable as needed. The management server C manages the printing devices MFP-1C and MFP-2C arranged in the area C of the network environment.

That is, each management server manages a network area and printing devices existing in it. In this embodiment, each network area is specified by a management network ID. The management network ID identifies a subnet by a value represented by the logical product of an IP address and a subnet mask.

The client A is a client computer capable of moving to and connecting with the areas A, B, and C of the network environment as needed. So-called printer drivers as shown in FIG. 5 (to be described later) are installed in the client A to implement printing by a printing device connected to the network environment to which the client A is connected.

<Example of Arrangement in Each Area of>Embodiment

Figure 2A:
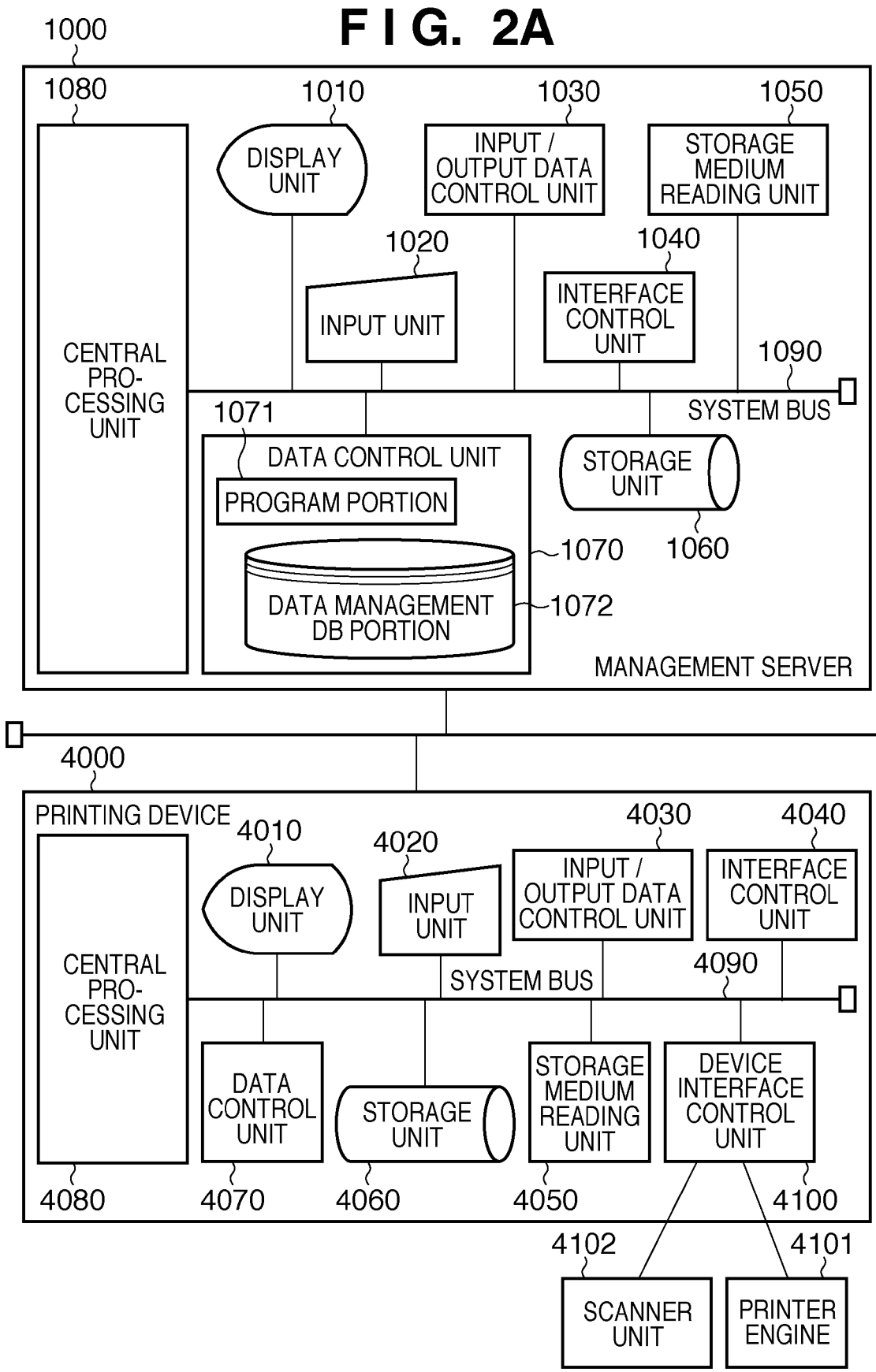
FIGS. 2A and 2B are a block diagram showing an example of the arrangement in each area in FIG. 1.
Figure 2B:
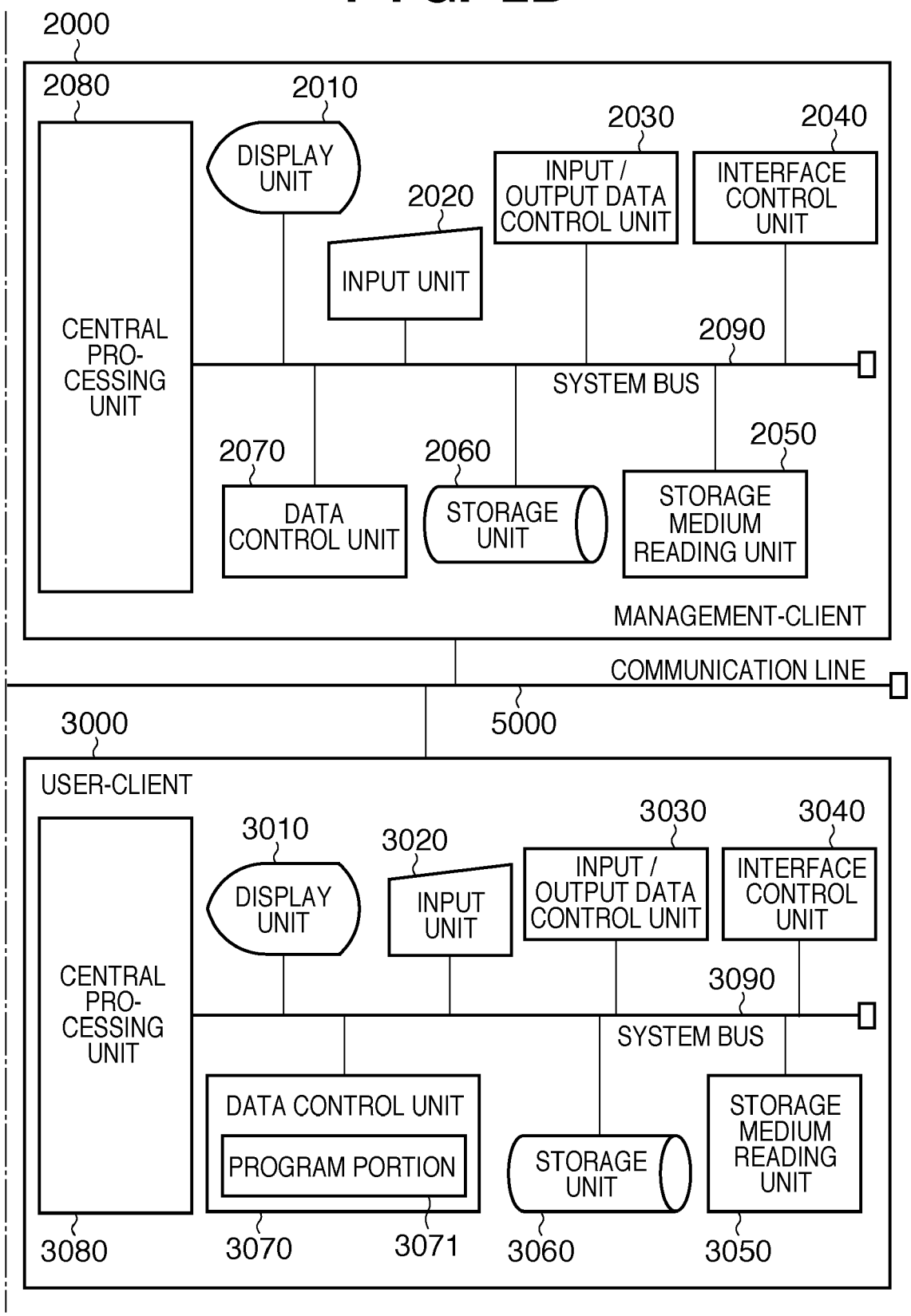

FIGS. 2A and 2B are a block diagram of an information processing apparatus according to the embodiment, which is applied to a management server, manager-client, user-client, and device. The information processing apparatus can be a general-purpose computer to which peripheral devices are added in accordance with its application purpose.

Referring to FIGS. 2A and 2B, a management server 1000, management-client 2000, user-client 3000, and printing device 4000 as a device (MFP in FIG. 1) are connected to a communication line 5000. FIGS. 2A and 2B illustrate one area in FIG. 1. The number of connected information processing apparatuses may change, however FIGS. 2A and 2B contain one area (of which there are three in FIG. 1); areas are connected via routers.

These information processing apparatuses include central processing units (to be referred to as CPUs hereinafter) 1080, 2080, 3080, and 4080, respectively.

Storage medium reading units 1050, 2050, 3050, and 4050 read out stored information from a computer-readable storage medium such as an FD, CD-ROM, or IC memory card which stores computer programs and associated data.

System programs and application programs are loaded from storage units 1060, 2060, 3060, and 4060 to data control units 1070, 2070, 3070, and 4070. The system programs and application programs process information input from input units 1020, 2020, 3020, and 4020. Data are input/output between the communication line 5000 and system buses 1090, 2090, 3090, and 4090 via interface control units 1040, 2040, 3040, and 4040.

In this embodiment, each of display units 1010, 2010, 3010, and 4010 is a display device such as a CRT display or a liquid crystal display. Each of the input units 1020, 2020, 3020, and 4020 includes a keyboard and a pointing device such as a mouse. Each of the storage units 1060, 2060, 3060, and 4060 can be formed from a hard disk or a magneto-optical disk, or a combination thereof.

The main operation of the embodiment is related to a program portion 1071 and data management DB portion 1072 located in the data control unit 1070 of the management server 1000, and a program portion 3071 located in the data control unit 3070 of the user-client 3000 in each area.

The communication line 5000 is a normal LAN or a bidirectional serial interface such as IEEE1394 or USB.

The printing device 4000 is a printing device (MFP) having a so-called multi-function and holding a scanner unit 4102 and a printer engine 4101 serving as a print unit, which are connected to a device interface control unit 4100.

The printing device 4000 holds device information such as MIB. Acquirement and setting of the pieces of information can mainly be implemented from the management-client 2000 via the network.

On the other hand, the client 3000 can perform printing from an application via a so-called printer driver or acquire data scanned by the scanner unit 4102 of the printing device 4000 via a scanner driver.

The relationship between the arrangement of the print system in FIGS. 2A and 2B and the system arrangement in FIG. 1 will be described next.

Each of the management servers A, B, and C in FIG. 1 is the management server 1000 in FIG. 2A. Each of MFP-1 and MFP-2 in FIG. 1 is the printing device 4000 in FIG. 2A. The client A in FIG. 1 is the user-client 3000 in FIG. 2B. In this embodiment, the client A also serves as the management-client 2000.

<Various Kinds of Information Used in Embodiment>

Examples of the configurations of various kinds of information used in the processing of the embodiment will be described below.

(Information Tables Stored in Data Management DB Portion 1072 of Management Server: FIGS. 3A and 3B)

FIGS. 3A and 3B show information tables which the management servers A, B, and C in FIG. 1 manage in their data management DB portions 1072 in FIG. 2A.

A managed devices information table 301 is an information table associated with printing devices managed by each management server. In this embodiment, the managed devices information table 301 has a printing device name 301*a* and an IP address 301*b.*

For example, the management server A manages a printing device having a printing device name "MFP-1A" based on an IP address "100.10.0.1", and a printing device having a printing device name "MFP-2A" based on an IP address "100.10.0.2". Similarly, the management server B manages a printing device having a printing device name "MFP-1B" based on an IP address "100.10.1.1", and a printing device having a printing device name "MFP-2B" based on an IP address "1100.10.1.2". The management server C manages a printing device having a printing device name "MFP-1C" based on an IP address "100.10.2.1", and a printing device having a printing device name "MFP-2C" based on an IP address "100.10.2.2".

These printing devices indicate a result obtained when the management servers have caused the program portion 1071 in FIG. 2A to search for the printing devices connected in the network environment. The search indicates search by communication such as broadcast or readout of data files associated with the network environment via the storage medium reading unit 1050.

A network management information table 302 in FIG. 3A is an information table associated with the network of each management server.

In this embodiment, the network management information table 302 has a server name 302*a* of the management server itself, a normal IP address 302*b* to be used for unicast, an IP address 302*c* to be used for anycast, and a management network ID 302*d* managed by the management server itself.

For example, the management server A has a server name "the management server A", a normal IP address "100.10.0.0" for unicast, an IP address "150.10.0.0" for anycast, and a management network ID "100.10.0.xxx". Hence, printing devices managed under the management network ID are the printing device MFP-1A having the IP address "100.10.0.1" and the printing device MFP-2A having the IP address "100.10.0.2" described above.

Similarly, the management server B has a server name "the management server B", a normal IP address "100.10.1.0" for unicast, an IP address "150.10.1.0" for anycast, and a management network ID "100.10.1.xxx". Hence, printing devices managed under the management network ID are the printing device MFP-1B having the IP address "100.10.1.1" and the printing device MFP-2B having the IP address "100.10.1.2" described above.

Similarly, the management server C has a server name "management server C", a normal IP address "100.10.2.0" for unicast, an IP address "150.10.2.0" for anycast, and a management network ID "100.10.2.xxx". Hence, printing devices managed under the management network ID are the printing device MFP-1C having the IP address "100.10.2.1" and the printing device MFP-2C having the IP address "100.10.2.2" described above.

An associating information table 303 in FIG. 3B is an information table to associate a printing device managed by each management server with a printer driver corresponding to the printing device.

In this embodiment, the associating information table 303 has an association name 303*a,* printing device name 303*b,* and driver name 303*c.*

For example, the associating information managed by the management server A associates the printing device MFP-2A with the IP address "100.10.0.2" and a printer driver Driver_A_v100 with an association name "area-A__2F". Additionally, the printing device MFP-1A with the IP address "100.10.0.1" and the printer driver Driver_A_v100 are associated with an association name "area-A__1F".

Similarly, the associating information managed by the management server B associates the printing device MFP-2B with the IP address "100.10.1.2" and the printer driver Driver_A_v100 with an association name "area-B__2F". Additionally, the printing device MFP-1B with the IP address "100.10.1.1" and the printer driver Driver_A_v100 are associated with an association name "area-B_1F".

Similarly, the associating information managed by the management server C associates the printing device MFP-2C with the IP address "100.10.2.2" and the printer driver Driver_A_v100 with an association name "area-C_2F". Additionally, the printing device MFP-1C with the IP address "100.10.2.1" and the printer driver Driver_A_v100 are associated with an association name "area-C_1F".

The printer driver Driver_A_v100 of this embodiment is of many-to-one type that allows one printer driver to support a plurality of printing devices. This indicates that both MFP-1 and MFP-2 use the same printer driver. Such a printer driver normally changes the printer name and the module to install depending on the installation target device. In this embodiment, the association name is used to uniquely identify them.

If a printing device and a printer driver are in a one-to-one correspondence, the printer driver name is directly used in place of the association name.

A default printer information table 304 in FIG. 3B holds printer information which is set by each the management server As a default for each client when it is connected to the network environment.

In this embodiment, the default printer information table 304 has a client name 304a and a printer name 304b.

The management server A sets a printer "area-A_2F" as the default printer for the client A when it is connected.

Similarly, the management server B sets a printer "area-B_2F" as the default printer for the client A when it is connected.

On the other hand, the management server C manages no default printer information about the client A.

This indicates that, under the management server C, the client A has no printer drivers corresponding to the printing devices managed by the management server C. The printer drivers are managed in the data management DB portion 1072 shown in FIG. 2A.

(Management Server Information Table Acquired from the Management Server and Stored in Storage Unit of Client: FIG. 4)

FIG. 4 shows an example of the arrangement of a management server information table 400 acquired from the management server A or B and stored in the storage unit 3060 of the client in accordance with the procedure shown in FIG. 6 to be described later.

As network management information, a management server name 401, IP address 402 for anycast, and IP address 403 for unicast are acquired from the management server A or B and stored in the storage unit 3060.

FIG. 4 shows that the storage unit saves the information of a management server whose management server name is "the management server A" and which has an IP address "150.10.0.0" for anycast and an IP address "100.10.0.0" for unicast. The storage unit also saves the information of a management server whose management server name is "the management server B" and which has an IP address "150.10.0.0" for anycast and an IP address "100.10.1.0" for unicast.

The pieces of information about the management servers A and B can be acquired by repeating the process shown in FIG. 6 to be described later. The information acquirement can also be implemented by the process in FIGS. 9A and 9B.

(Printer Information Installed in Client and Default Printer: FIG. 5)

FIG. 5 is a table showing printer information installed in the client A and a default printer.

A printer name "area-A_1F" is that of the printing device MFP-1A which is connected to the area A of the network environment and performs printing via a port with the IP address "100.10.0.1". Similarly, a printer name "area-A_2F" is that of the printing device MFP-2A which is connected to the area A of the network environment and performs printing via a port with the IP address "100.10.0.2".

A printer name "area-B_1F" is that of the printing device MFP-1B which is connected to the area B of the network environment and performs printing via a port with the IP address "100.10.1.1". Similarly, a printer name "area-B_2F" is that of the printing device MFP-2B which is connected to the area B of the network environment and performs printing via a port with the IP address "100.10.1.2".

That is, printer drivers corresponding to the printer names "area-A_1F", "area-A_2F", "area-B_1F", and "area-B_2F" are installed in the client A.

When the client A is connected to the area A of the network environment, the printer name "area-A_2F" indicates the default printer, as shown on the left side of FIG. 5. However, when the client A is connected to the area B of the network environment, the printer name "area-B_2F" indicates the default printer, as shown on the right side of FIG. 5.

<Example of Operation Procedure of System of Embodiment>

An example of the operation procedure of the system according to this embodiment will be described below in detail on the basis of the system arrangement, the arrangement of each information processing apparatus, and the information tables of the embodiment.

(Example of Procedure of Initializing Client A)

An example will next be described with reference to FIG. 6 in which the management-client accesses the management server A or B (corresponding to the management server 1000 in FIG. 2A) to install the program portion of the client A, and the information tables shown in FIGS. 4 and 5 are formed.

The management-client 2000 (in this example, the client A also serves as the management-client 2000) in FIG. 2B accesses the management server A or B via the display unit 2010 and the input unit 2020. The CPU 1080 of the management server A or B executes a task to install, in the client A, the program portion 3071 of the client A, which is a service program (step S100).

The access from the management-client 2000 to the management server A or B indicates that the management-client 2000 operates, via a browser, a so-called Web application provided in the program portion 1071 that runs on the management server A or B. Execution of the task for installation indicates that the program portion 1071 remote-installs a predetermined program in the client A. The program portion 3071 of the client A is a service program which runs as a background application or automatically executes a service process when the client A is activated. The program portion 3071 of the client A has an authority to install a printer driver in the operating system running on the client A. The Web application program of the management server A is a program capable of implementing transmission/reception by a Web service using so-called SOAP.

The CPU 3080 of the client A activates an installer for installing the program portion 3071 of the client A, which is a service program sent from the management server A or B (step S101). The CPU 3080 judges whether or not the program portion 3071 of the client A exists in the data control unit 3070 of the client A (step S102). In the initial loop, this step ends with a "NO".

Next, the CPU 3080 causes the installer for installing the service program to communicate with the program portion of the management server A or B by a Web service. With this process, the CPU 3080 acquires the service program corresponding to the program portion 3071 of the client A and a management server name, IP address for anycast, and IP address for unicast as the network management information of the management server A or B (step S103). The CPU 3080 installs the service program in the data control unit 3070 of the client A as a service or background application (step S104).

The CPU 3080 saves the network management information of the management server A or B, which is acquired in step S103, in the storage unit 3060 such as a so-called registry or file (step S105). An example of the network management information is shown in FIG. 4 described above.

FIG. 4 shows that the storage unit saves the information of a management server whose management server name is "the management server A" and which has an IP address "150.10.0.0" for anycast and an IP address "100.10.0.0" for unicast. The storage unit also saves the information of a management server whose management server name is "the management server B" and which has an IP address "150.10.0.0" for anycast and an IP address "100.10.1.0" for unicast.

Figure 6:
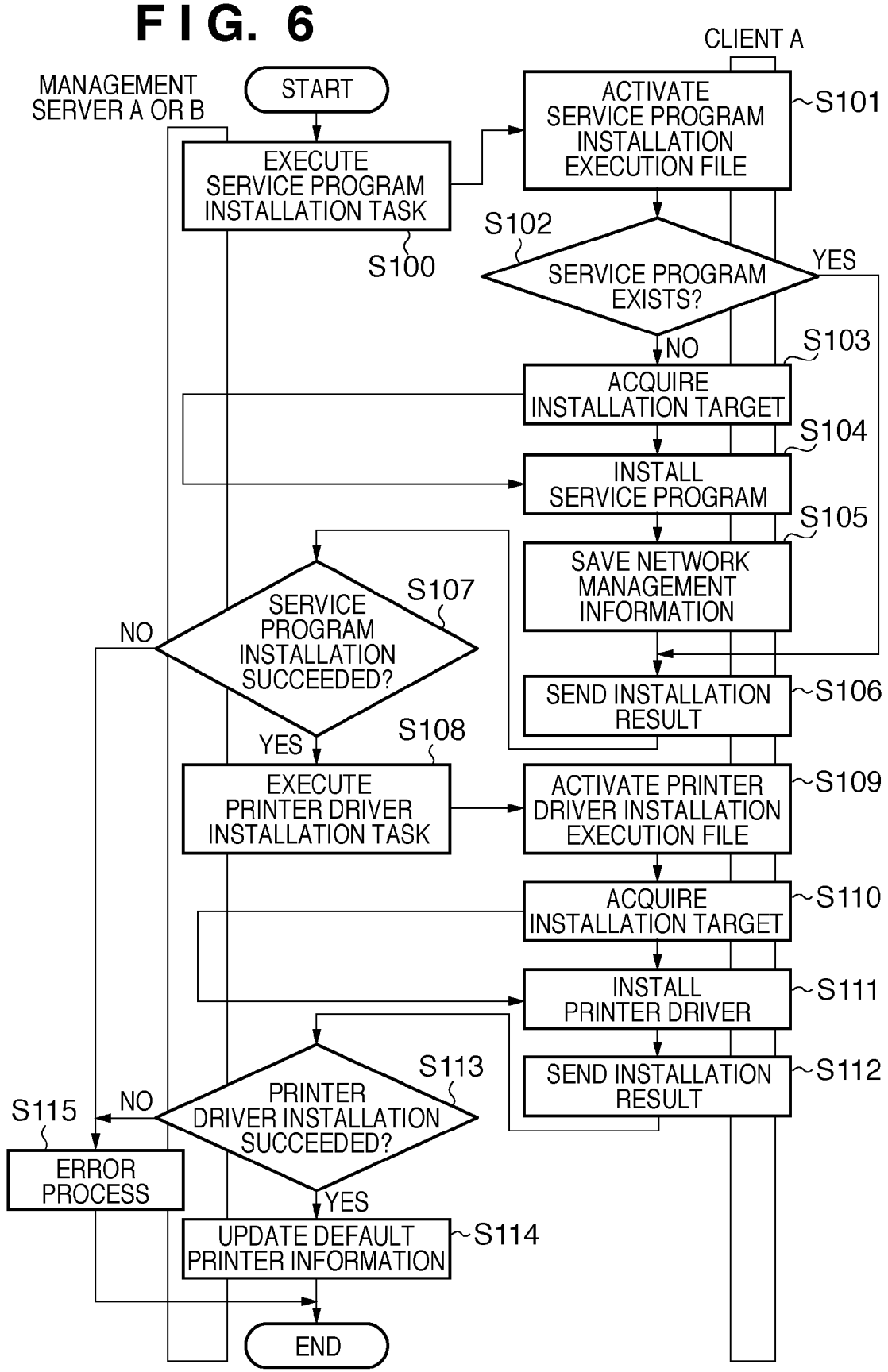
FIG. 6 is a flowchart illustrating a process of setting a precondition of the embodiment in a client A.

The pieces of information about the management servers A and B can be acquired by repeating the process shown in FIG. 6. The information acquirement can also be implemented by the process in FIGS. 9A and 9B.

Next, the CPU 3080 sends the result in steps S103 and S104 or the result "YES" in step S102 to the program portion 1071 of the management server A or B (step S106).

The CPU 1080 judges, in accordance with the program portion 1071 of the management server A or B, whether or not the installation has succeeded (step S107), and the step ends with a "YES". When "YES" in step S102, the CPU 1080 determines in step S107 that the installation has succeeded.

The CPU 1080 sends an installer having associating information for printer driver installation to the program portion 3071 of the client A as a printer driver installation task in accordance with the program portion 1071 of the management server A or B (step S108). The CPU 3080 executes the installer in accordance with the program portion 3071 of the client A (step S109).

The installer acquires a predetermined printer driver associated by the associating information received together with the installer via the program portion 1071 of the management server A or B and a Web service using so-called SOAP (step S110). The printer driver itself is saved in advance in the data management DB portion 1072 shown in FIG. 2A or an external storage area such as an FTP or HTTP site and is downloadable from the service program.

The CPU 3080 installs the printer driver (step S111). In step S111, the CPU acquires the IP address information of the device to be connected, in addition to the printer driver, and executes port settings as part of printer driver installation, as a matter of course. The CPU also decides whether or not to set the installed printer driver as the default printer. This also means that if there are a plurality of printer drivers to be installed, an arbitrary one of them is set as the default printer.

The CPU 3080 sends the result in step S111, that is, a notification representing a success or failure of the installation and the default printer information to the program portion 1071 of the management server A or B (step S112). The CPU 1080 judges, in accordance with the program portion 1071, whether or not the printer driver installation has succeeded (step S113), and the step ends with a "YES". If the default printer information in step S112 represents that a printer corresponding to a printing device managed by the management server is set as the default printer, the CPU 1080 updates the default printer information table shown in FIG. 3B (step S114).

On the other hand, if it is determined upon judging in step S107 that the service program installation process and the network information saving process have failed, the CPU 1080 notifies the management-client A of the result (step S115). If it is determined upon judging in step S113 that the printer driver installation process has failed, the CPU 1080 notifies the management-client A of the result (step S115).

As an example of the installation result notification in step S115, the CPU 1080 displays the result on the browser of the management-client 2000 in accordance with the program portion 1071 that is a Web application. Alternatively, the CPU 1080 sends the notification to the management-client 2000 using a mail function.

The process in step S114 may also include the process of causing the CPU 1080 to display the result on the browser of the management-client 2000 in accordance with the program portion 1071 that is a Web application or send the notification to the management-client 2000 using a mail function.

FIG. 4 and the view on the left side of FIG. 5 show examples of the installation result in the client A according to the above-described process. FIG. 4 shows an example of the management server information saved in step S104, in which the management server information of each of the management servers A and B is saved. The view on the left side of FIG. 5 shows the printer driver installation state in the client A. The installation state indicates that four printer drivers using association names as the printer names are installed. The default printer is "area-A__2F".

FIG. 6 illustrates the process from step S100 to step S115 as a continuous flowchart. However, the process in steps S100 to S107, the process in steps S114 and S115, and the process in steps S108 to S115 may be performed as asynchronous processes (i.e., parallel processes). That is, it is possible to asynchronously execute the installation process of the program portion 3071 of the client A and the printer driver installation process.

A preconditioning process for implementing the characteristic process of the embodiment when the client A has moved from the area A to the area B has been described above.

(Example of Movement Control of Client A from Area A to Area B)

A process of this embodiment for the program portion 3071 of the client A which has acquired the information shown in FIG. 4 and on the left side of FIG. 5, and the program portion 1071 of the management server which has acquired the information shown in FIGS. 3A and 3B by the process in FIG. 6 will next be described in detail.

Referring to FIG. 7, first, the CPU 3080 of the client A changes the connection target from the area A to the area B of the network environment (step S200). This indicates that the client A in FIG. 1 changes the connection target from the area A to the area B of the network environment.

The CPU 3080 activates the client A connected to the area B of the network environment in FIG. 1, thereby activating the program portion 3071 of the client A in the data control unit 3070 of the client A (step S201). In accordance with the program portion 3071 of the client A, the CPU 3080 acquires the IP address for anycast to the management server from the management server information table 400 in FIG. 4 which is saved in the storage unit 3060 (step S202). In accordance with the program portion 3071 of the client A, the CPU 3080 judges whether or not the IP address for anycast is acquired (step S203). The step ends with a "YES". In the embodiment, this indicates that the IP address "150.10.0.0" for anycast common to the management servers A and B in FIG. 4 is acquired.

In accordance with the program portion 3071 of the client A, the CPU 3080 executes anycast to the management servers using the IP address for anycast acquired in step S202 (step S204). This means that the client A shown in FIG. 1 performs anycast to the management servers A, B, and C. Anycast is a technique that has mainly been put into practical use by IPv6.

Anycast is a communication method to be used by IPv6, which can transmit information to an optimum device of a selected group. In anycast, an IP address called an anycast address is assigned to a group. When information is transmitted to the IP address, it is transmitted to the group. A target that has an optimum condition, for example, "located at the nearest position in the network" receives the information.

This technique enables assignment of a unique IP address, which would normally be assigned to a specific node on the Internet, to an IP address common to a specific service. In accordance with the program portion 3071 of the client A, which allows a plurality of nodes to share a common IP address, the CPU 3080 performs, using the IP address for anycast, anycast to the plurality of management servers having the IP address for anycast.

In accordance with the program portion 3071, the CPU 3080 acquires network management information from a management server that has responded to the anycast. Additionally, the CPU 3080 selects a printer driver to be used in accordance with the program portion 3071 using the network management information acquired in accordance with the program portion 3071.

More specifically, as a characteristic feature of anycast, when anycast is executed to a plurality of nodes using a common anycast IP address on the Internet, an appropriate node located at the nearest position on the network, as viewed from the client that has issued the anycast message, responds. The appropriate node may change depending upon the embodiment. For example, a selection unit having a routing protocol may select, as the appropriate node, a node that has responded to anycast from the selection unit at the earliest timing. Note that a specific node indicates a network interface connected to the Internet.

That is, when the client A connected to the network area A performs anycast to the management servers A, B, and C shown in FIG. 1 of the embodiment, the management server A responds. This means that when the client A is connected to the network area B, the management server B responds. Similarly, when the client A is connected to the network area C, the management server C responds.

The CPU 3080 judges, in accordance with the program portion 3071 of the client A, whether or not a management server has responded to the anycast in step S204 (step S205), and the step ends with a "YES". In this embodiment, the client A exists in the area B. Hence, the management server B in the area B of the network environment as shown in FIG. 1 responds to the anycast.

Figure 8A:
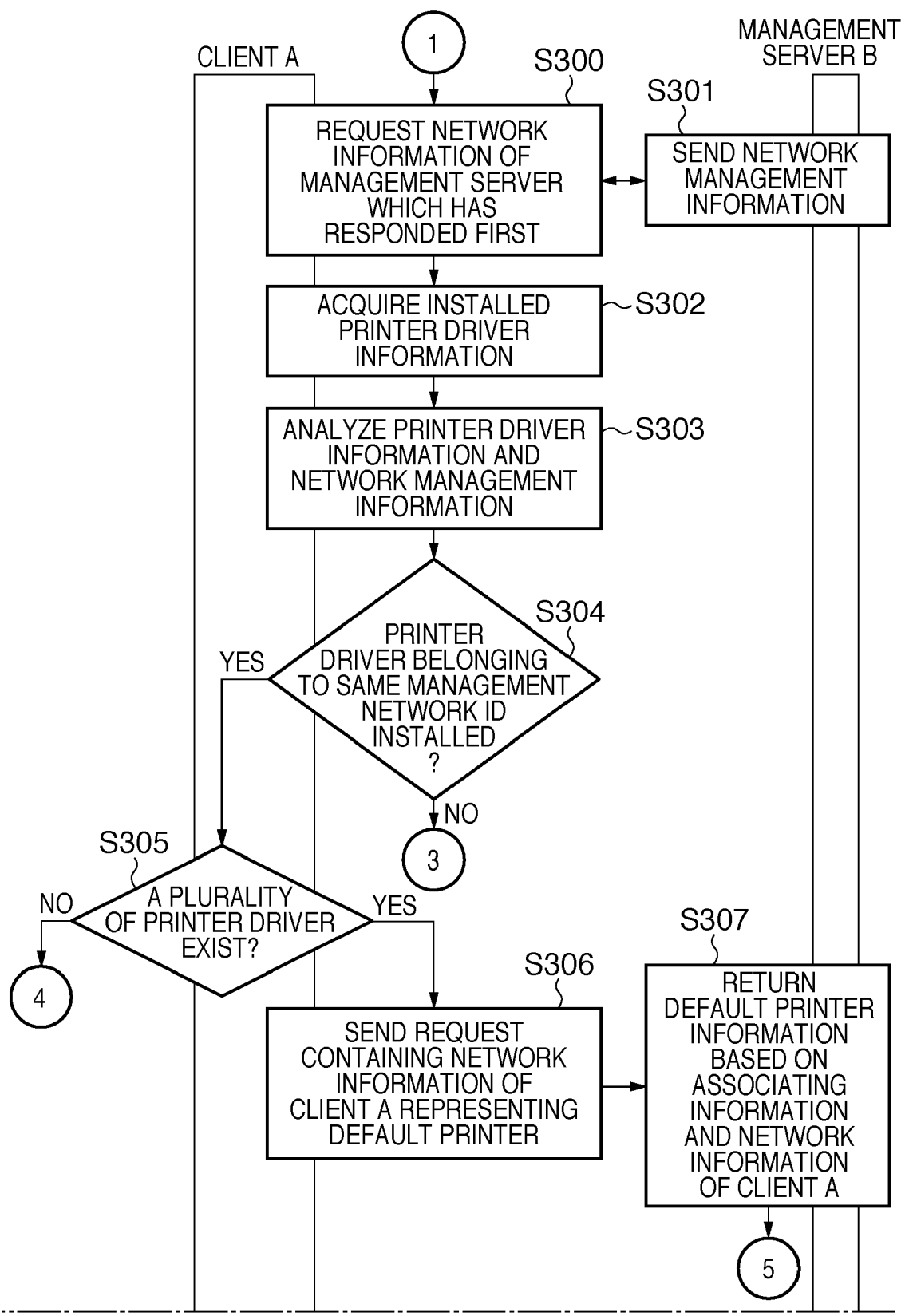
FIGS. 8A and 8B are a flowchart illustrating a process when the client A of the embodiment has moved from the area A to the area B.
Figure 8B:
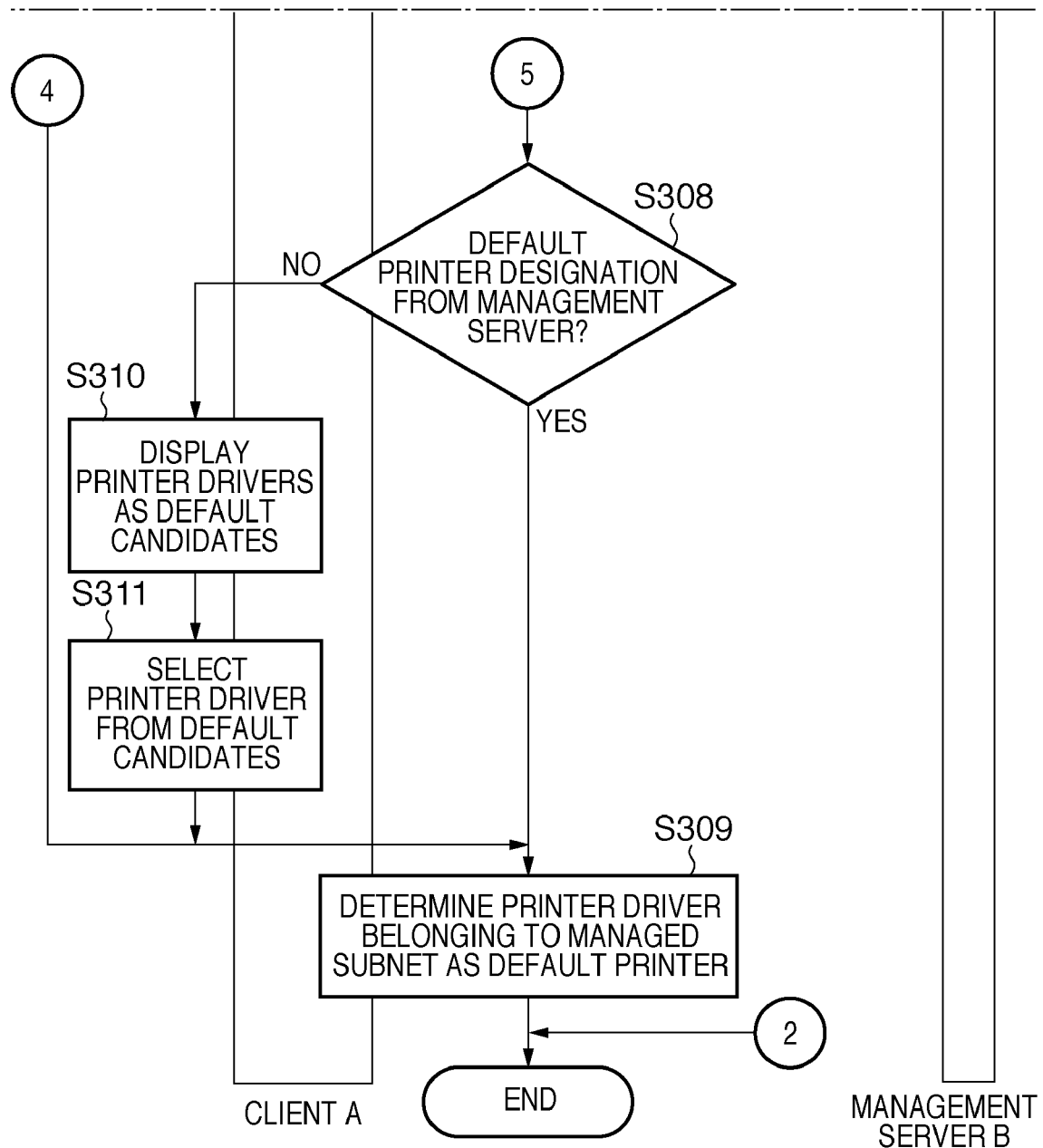

The process advances to FIGS. 8A and 8B. In accordance with the program portion 3071 of the client A, the CPU 3080 requests the program portion 1071 of the management server (management server B in this example) which has responded first to acquire the associating information table 303 and the default printer information table 304 shown in FIG. 3B (step S300). This means a request to acquire the associating information table 303 and the default printer information table 304 in the network management information shown in FIGS. 3A and 3B managed by the management server B in FIG. 1.

In accordance with the program portion 1071 of the management server B, the CPU 1080 sends the network management information to the program portion 3071 of the client A in response to the request in step S300 (step S301). On the other hand, the CPU 3080 acquires the installed printer driver information (device driver information) shown in FIG. 5 in accordance with the program portion 3071 of the client A (step S302).

In accordance with the program portion 3071 of the client A, the CPU 3080 executes an analysis process to judge, on the basis of the acquired network management information and the acquired installed printer driver information, whether or not the printer drivers of printing devices are installed (step S303). This means that the client A in FIG. 1 executes an analysis process to judge whether or not the printer drivers of MFP-1B and MFP-2B that are printing devices in the area B managed by the management server B are installed in the client A.

In accordance with the program portion 3071 of the client A, the CPU 3080 judges, as the result of the analysis process in step S303, whether or not printer drivers belonging to the same management network environment are installed (step S304), and the step ends with a "YES".

In accordance with the program portion 3071 of the client A, the CPU 3080 judges whether or not the program portion 1071 of the management server B manages a plurality of printer drivers of printing devices (step S305). In this embodiment, since the plurality of printer names "area-B__1F" and "area-B__2F" exist, as shown in FIG. 5, the step ends with a "YES".

In accordance with the program portion 3071 of the client A, the CPU 3080 sends the network information of the client A to the management server B to determine the default printer (step S306). In the embodiment, this means that the client A sends its client name information "client A" to the management server B.

In accordance with the program portion 1071 of the management server B, the CPU 1080 sends default printer designation information to the program portion 3071 of the client A on the basis of the default printer information and the received network information of the client A (step S307).

In the embodiment, this means that the management server B sends the printer name "area-B__2F" to the client A on the basis of the client name information "client A" from the client A in step S306 and the default printer information shown in FIG. 3B.

In accordance with the program portion 3071 of the client A, the CPU 3080 judges whether or not the default printer designation is received from the program portion 1071 of the management server B (step S308), and the step ends with a "YES". In accordance with the program portion 3071 of the client A, the CPU 3080 sets the printer designated in step S307 as the default printer (step S309) and finishes the moving process of the client A from the area A to the area B.

In the embodiment, this means that the printer name "area-B__2F" is set as the default printer, as shown on the right side of FIG. 5.

(Example of Movement Control of Client A to Area C)

On the other hand, when the client A has moved to the area C, the CPU 3080 judges, as the result of the analysis process in step S303, that no printer driver belonging to the same management network environment is installed. Step S304 results in a "NO", and then, the process advances to FIGS. 9A and 9B.

Figure 9A:
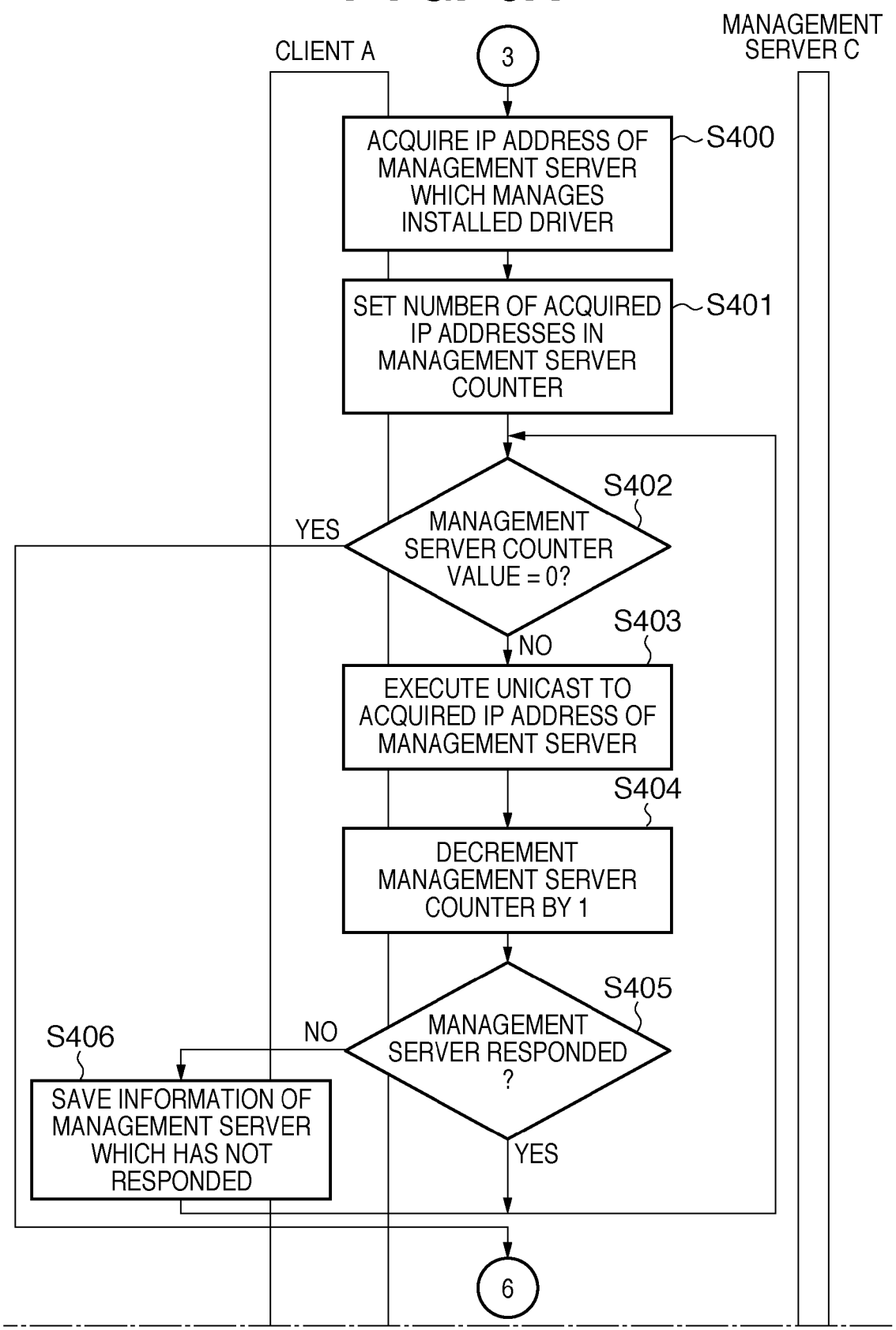
FIGS. 9A and 9B are a flowchart illustrating a succeeding-stage process when the client A of the embodiment has moved to an area C.
Figure 9B:
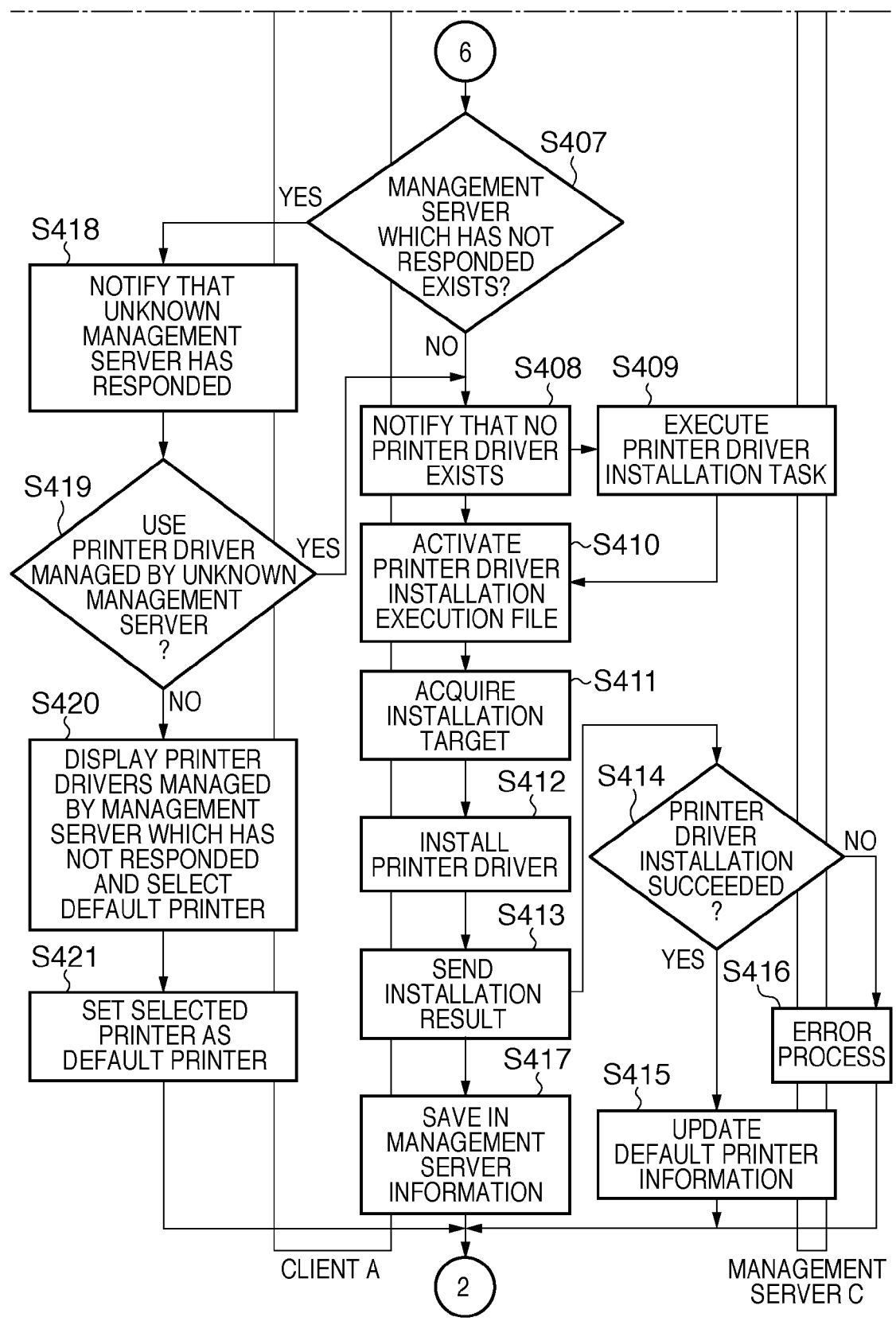

Referring to FIGS. 9A and 9B, in accordance with the program portion 3071 of the client A, the CPU 3080 acquires the IP address for unicast from the management server information that manages the installed printer drivers (step S400). In the embodiment, this means that the IP address "100.10.0.0" for unicast of the management server A and the IP address "100.10.1.0" for unicast of the management server B in FIG. 4 are acquired.

Next, in accordance with the program portion 3071 of the client A, the CPU 3080 sets the number of acquired IP addresses for unicast in a management server counter (step S401). The management server counter indicates a variable storage area such as a memory, registry, or file allocated in the program portion 3071 of the client A. In this embodiment, since the two IP addresses for unicast of the management servers A and B are acquired, the client A sets "2" in the management server counter.

In accordance with the program portion 3071 of the client A, the CPU 3080 judges whether or not the management server counter value is 0 (step S402), and the step ends with a "NO".

In accordance with the program portion 3071 of the client A, the CPU 3080 executes unicast to one of the acquired IP addresses of management servers (step S403). In this embodiment, since the client A has acquired two unicast addresses, unicast is performed first to the IP address "100.10.0.0" for unicast of the management server A. Next, in accordance with the program portion 3071 of the client A, the CPU 3080 decrements the management server counter value by "1" (step S404). In accordance with the program portion 3071 of the client A, the CPU 3080 judges whether or not the management server A has responded to the unicast in step S403 (step S405), and the step ends with a "NO". In the embodiment, this means that the CPU judges whether or not the management server A has responded to the unicast performed by the client A to the management server A.

In accordance with the program portion 3071 of the client A, the CPU 3080 saves the information of the management server that has not responded in a storage area such as a memory, registry, or file allocated in the service program (step S406). Next, in accordance with the program portion 3071 of the client A, the CPU 3080 returns to the process in step S402. Even if "YES in step S405, the process returns to step S402.

In this embodiment, it is assumed that the management server counter of the client A is "2". Hence, the judgment in step S402 results in a "YES" after the client A has executed unicast to each of the management servers A and B.

In accordance with the program portion 3071 of the client A, the CPU 3080 judges, by referring to the value saved in step S406, whether or not a management server that has not responded is present (step S407), and it is assumed that the process advance to step S408 with a "NO". In the embodiment, this means that both the management servers A and B have responded to the client A. This indicates the fact that the client A is connected to the network environment including the management server which has responded to the anycast in step S205 in FIG. 7. In FIG. 1, this means that the client A is connected to the area C of the network environment.

The CPU 3080 notifies the program portion 1071 of the management server C which has responded to the anycast from the program portion 3071 of the client A in step S205 in FIG. 7 that no printer driver managed by the management server exists (step S408). In the embodiment, this means a notification from the client A to the management server C.

The CPU 1080 sends an installer for printer driver installation to the program portion 3071 of the client A by a printer driver installation task in accordance with the program portion 1071 of the management server C (step S409). In the embodiment, this means that the management server C sends, to the client A, an installer for printer driver installation by a printer driver installation task. The installer includes the associating information and the network management information shown in FIGS. 3A and 3B for printer driver installation.

In accordance with the program portion 3071 of the client A, the CPU 3080 executes the installer sent from the program portion 1071 of the management server C (step S410). The installer communicates with the program portion 1071 of the management server C via a Web service using so-called SOAP. In the embodiment, this means that the installer that runs on the client A communicates with the management server C via a Web service.

In accordance with the program portion 3071 of the client A, the CPU 3080 acquires, from the data management DB portion 1072 of the management server C, a printer driver associated by the associating information received together with the installer from the program portion 1071 of the management server C (step S411). In accordance with the program portion 3071 of the client A, the CPU 3080 installs the printer driver (step S412). In step S412, the CPU 3080 acquires the IP address information of the device to be connected, in addition to the printer driver, and executes port settings as part of printer driver installation, as a matter of course.

The CPU also decides whether to set the installed printer driver as the default printer. This also means that if there are a plurality of printer drivers to be installed, an arbitrary one of them is set as the default printer.

In accordance with the program portion 3071 of the client A, the CPU 3080 sends the result in step S412, that is, a notification representing success or failure of the installation and the default printer information to the program portion 1071 of the management server C (step S413). In the embodiment, this means that the client A sends the installation result information to the management server C.

The CPU 1080 judges, in accordance with the program portion 1071 of the management server C, whether or not the printer driver installation has succeeded (step S414), and the step ends with a "YES". If the default printer information in step S412 is the default printer information managed by the server, the CPU 1080 updates the default printer information table shown in FIG. 3B in accordance with the program portion 1071 of the management server C (step S415).

On the other hand, if it is determined upon judging in step S414 that the printer driver installation process in the client A has failed, the CPU 1080 notifies the management-client 2000 of the result (step S416).

As an example of the installation result notification in step S416, the CPU 1080 displays the result on the browser of the management-client 2000 in accordance with the program portion 1071 that is a Web application. Alternatively, the CPU 1080 sends the notification to the management-client 2000 using a mail function. The process in step S415 may also include the process of causing the CPU 1080 to display the result on the browser of the management-client 2000 in accordance with the program portion 1071 that is a Web application or send the notification to the management-client 2000 using a mail function.

In this embodiment, the client A in FIG. 1 serves as both the management-client 2000 and the client 3000 in FIG. 2B. Hence, the CPU 1080 sends the notification to the client A in accordance with the program portion 1071 of the management server C.

Next, the CPU 3080 of the client A updates the management server information table shown in FIG. 4 in accordance with the information received in step S409 (step S417) and finishes the moving process of the client A to the area C. In the embodiment, this means that the management server name, IP address for anycast, and IP address for unicast of the management server C are registered in the table shown in FIG. 4.

On the other hand, if it is determined upon judging in step S407 that a management server that has not responded is present, the CPU 3080 notifies, in accordance with the program portion 3071 of the client A, the user of the client A that a response from an unknown management server is received (step S418). This notification indicates a means for, for example, displaying a message box on the display unit 3010 of the client A.

In this embodiment, if it is determined in step S407 that a management server that has not responded is present, this means one of the following situations.

(1) Although the client A has moved from the area A to the area B of the network environment in FIG. 1, the management server C has responded to the anycast in step S204 in FIG. 6. This means that the management server B which should respond cannot do so because of, for example, a system failure.

(2) Although the client A has moved from the area A to the area C of the network environment in FIG. 1, the management server C has not responded to the unicast in step S403 in FIG. 9A. This means that the management server which should respond cannot do so because of, for example, a system failure, and the client A which is connected to the area C of the network environment as requested is in fact in the area B of the network environment.

In this case, the CPU 3080 judges, in accordance with the program portion 3071 of the client A, whether or not to use a printer driver managed by the program portion 1071 of the unknown management server (step S419) and it is assumed that the process advances to step S420 with a "NO". In the embodiment, this "NO" indicates the fact that the CPU has determined that the client A is connected not to the area C but to the area B of the network environment.

Next, in accordance with the program portion 3071 of the client A, the CPU 3080 displays, based on the printer derivers installed in the client A in FIG. 5, the printers managed by the management servers which have not responded, and prompts the user to select the default printer from them (step S420). Finally, in accordance with the program portion 3071 of the client A, the CPU 3080 sets the selected printer as the default printer (step S421) and finishes the area moving process.

On the other hand, when the program portion 3071 of the client A has judged in step S419 to use a printer driver managed by the unknown management server, the CPU 3080 executes the process in steps S408 to S417 and finishes the moving process of the client A to the area C.

If no IP address information for anycast is acquired in step S203 in FIG. 7, the CPU 3080 finishes the area moving process in accordance with the program portion 3071 of the client A. Similarly, if no management server has responded to the anycast in step S205 in FIG. 7, the CPU 3080 finishes the area moving process in accordance with the program portion 3071 of the client A.

The present invention is also applicable to a system or integrated apparatus including a plurality of devices (for example, host computer, interface device, and printer) or an apparatus including a single device.

The object of the present invention is achieved even by supplying a non-transitory computer-readable storage medium (recording medium) which records software program codes for implementing the functions of the above-described embodiment to the system or apparatus and causing the computer (or CPU or MPU) of the system or apparatus to read out and execute the program codes stored in the non-transitory computer-readable storage medium.

In this case, the program codes read out from the storage medium implement the functions of the above-described embodiment by themselves, and the storage medium which stores the program codes constitutes the present invention.

The functions of the above-described embodiment are implemented not only when the computer executes the read-out program codes but also when the operating system (OS) running on the computer partially or wholly executes actual processing on the basis of the instructions of the program codes.

The functions of the above-described embodiment are also implemented when the program codes read out from the storage medium are written in the memory of a function expansion card inserted into the computer or a function expansion unit connected to the computer, and the CPU of the function expansion card or function expansion unit partially or wholly executes actual processing on the basis of the instructions of the program codes.

When the present invention is applied to the storage medium, it stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-175462, filed Jul. 3, 2007, which is hereby incorporated by reference herein in its entirety.

What is claimed is:

1. An information processing apparatus which is connected to one of a plurality of sub-areas in a network environment including a plurality of management servers, each of the plurality of management servers having an IP address for anycast and managing a device in a respective sub-area of the plurality of sub-areas, the information processing apparatus comprising:

an anycast unit adapted to perform anycast using an IP address for anycast included in server information managed by said information processing apparatus, in the connected sub-area;

a first request unit adapted to transmit a request, to a responding management server of the plurality of management servers which has responded to the performed anycast, for network management information managed by the responding management server;

a judgment unit adapted to judge, by analyzing the network management information acquired as a response to the request, whether or not a device driver for the device managed by the responding management server in the connected sub-area has been installed in said information processing apparatus;

a second request unit adapted to transmit a request, to the responding management server, for default device driver candidates corresponding to the information processing apparatus, in a case where said judgment unit judges that the device driver has been installed in said information processing apparatus and a plurality of device drivers including the device driver have been installed in said information processing apparatus;

an acquirement unit adapted to acquire, in a case where the judgment unit judges that the device driver has not been installed in said information processing apparatus, an installer for installing the device driver from the responding management server;

a controlling unit adapted to control to execute the installer acquired by the acquirement unit; and a selection unit adapted to select one device driver, which has been installed in said information processing apparatus or which is installed by the installer, as a default device driver corresponding to said information processing apparatus, wherein (i) in a case where the judgment unit judges that the device driver has been installed in said information processing apparatus and one device driver which is the device driver itself has been installed in said information processing apparatus, the selection unit is adapted to select the one device driver as the default device driver without installing another device driver in said information processing apparatus, (ii) in a case where the judgment unit judges that the device driver has been installed in said information processing apparatus and the plurality of device drivers have been installed in said information processing apparatus, the selection unit is adapted to select one device driver among the default device driver candidates, and (iii) in a case where the judgment unit judges that the device driver has not been installed in said information processing apparatus, the selection unit is adapted to select one device driver installed by the installer as the default device driver of said information processing apparatus, wherein the responding management server is adapted to manage a plurality of different devices in the connected sub-area, each of the plurality of different devices having its own IP address, and the responding management server is a separate device from the plurality of different devices, and wherein the device driver installed on the information processing apparatus by the installer is a device driver of one of the plurality of different devices, and wherein each of said units is implemented at least by a CPU.

2. The apparatus according to claim 1, wherein the device managed by the responding management server is a printer, and the device driver for the device managed by the responding management server is a printer driver.

3. The apparatus according to claim 1, further comprising an updating unit adapted to update the server information managed by said information processing apparatus based on the response to the anycast from the responding management server and the network management information acquired as the response of the request, wherein the server information includes the IP address for anycast and an IP address for unicast of the responding management server.

4. The apparatus according to claim 1, further comprising a unicast unit adapted to perform unicast using a plurality of IP addresses for unicast respectively associated with a plurality of the management servers, wherein the unicast unit and the anycast unit are adapted to work in conjunction to identify the connected sub-area.

5. A method executed by a physical information processing apparatus which is connected to one of a plurality of sub-areas in a network environment including a plurality of management servers, each of the plurality of management servers having an IP address for anycast and managing a device in a respective sub-area of the plurality of sub-areas, the method comprising:

an anycast step of performing anycast using an IP address for anycast included in server information managed by said information processing apparatus, in the connected sub-area;

a first request step of transmitting a request, to a responding management server of the plurality of management servers which has responded to the performed anycast, for network management information managed by the responding management server;

a judgment step of judging, by analyzing the network management information acquired as a response to the request, whether or not a device driver for the device managed by the responding management server in the connected sub-area has been installed in said information processing apparatus;

a second request step of transmitting a request, to the responding management server, for default device driver candidates corresponding to the information processing apparatus, in a case where it is judged in said judgment step that the device driver has been installed in said information processing apparatus and a plurality of device drivers including the device driver have been installed in said information processing apparatus;

an acquirement step of acquiring, in a case where it is judged in the judgment step that the device driver has not been installed in said information processing apparatus, an installer for installing the device driver from the responding management server;

a controlling step of controlling to execute the installer acquired in the acquirement step; and a selection step of selecting one device driver, which has been installed in said information processing apparatus or which is installed by the installer, as a default device driver corresponding to said information processing apparatus, wherein (i) in a case where it is judged in the judgment step that the device driver has been installed in said information processing apparatus and one device driver which is the device driver itself has been installed in said information processing apparatus, the selection step includes selecting the one device driver as the default device driver without installing another device driver in said information processing apparatus, (ii) in a case where it is judged in the judgment step that the device driver has been installed in said information processing apparatus and the plurality of device drivers have been installed in said information processing apparatus, the selection step includes selecting one device driver among the default device driver candidates, and (iii) in a case where the judgment unit judges that the device driver has not been installed in said information processing apparatus, the selection step includes selecting one device driver installed by the installer as the default device driver of said information processing apparatus, wherein the responding management server manages a plurality of different devices in the connected sub-area, each of the plurality of different devices having its own IP address, and the responding management server is a separate device from the plurality of different devices, and wherein the device driver installed on the information processing apparatus by the installer is a device driver of one of the plurality of different devices.

6. A non-transitory computer-readable storage medium storing a program that when executed by one or more computers in an information processing apparatus causes the information processing apparatus to execute a method, the information processing apparatus connected to one of a plurality of sub-areas in a network environment including a plurality of management servers, each of the plurality of management servers having an IP address for anycast and managing a device in a respective sub-area of the plurality of sub-areas, the method comprising:

an anycast step of performing anycast using an IP address for anycast included in server information managed by said information processing apparatus, in the connected sub-area;

a first request step of transmitting a request, to a responding management server of the plurality of management servers which has responded to the performed anycast, for network management information managed by the responding management server;

a judgment step of judging, by analyzing the network management information acquired as a response to the request, whether or not a device driver for the device managed by the responding management server in the connected sub-area has been installed in said information processing apparatus;

a second request step of transmitting a request, to the responding management server, for default device driver candidates corresponding to the information processing apparatus, in a case where it is judged in said judgment step that the device driver has been installed in said information processing apparatus and a plurality of device drivers including the device driver have been installed in said information processing apparatus;

an acquirement step of acquiring, in a case where it is judged in the judgment step that the device driver has not been installed in said information processing apparatus, an installer for installing the device driver from the responding management server; a controlling step of controlling to execute the installer acquired in the acquirement step; and a selection step of selecting one device driver, which has been installed in said information processing apparatus or which is installed by the installer, as a default device driver corresponding to said information processing apparatus, wherein (i) in a case where it is judged in the judgment step that the device driver has been installed in said information processing apparatus and one device driver which is the device driver itself has been installed in said information processing apparatus, the selection step includes selecting the one device driver as the default device driver without installing another device driver in said information processing apparatus, (ii) in a case where it is judged in the judgment step that the device driver has been installed in said information processing apparatus and the plurality of device drivers have been installed in said information processing apparatus, the selection step includes selecting one device driver among the default device driver candidates, and (iii) in a case where the judgment unit judges that the device driver has not been installed in said information processing apparatus, the selection step includes selecting one device driver installed by the installer as the default device driver of said information processing apparatus, wherein the responding management server manages a plurality of different devices in the connected sub-area, each of the plurality of different devices having its own IP address, and the responding management server is a separate device from the plurality of different devices, and wherein the device driver installed on the information processing apparatus by the installer is a device driver of one of the plurality of different devices.

* * * * *